United States Patent
Maeda et al.

(10) Patent No.: US 6,597,442 B2
(45) Date of Patent: Jul. 22, 2003

(54) APPARATUS FOR MEASURING ABERRATION OF A LENS AND AN APPARATUS FOR ADJUSTING A POSITION OF THE LENS

(75) Inventors: Takanori Maeda, Tsurugashima (JP); Toshiharu Ezuka, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/820,284

(22) Filed: Mar. 29, 2001

(65) Prior Publication Data

US 2001/0035948 A1 Nov. 1, 2001

(30) Foreign Application Priority Data

Mar. 31, 2000 (JP) ........................................ 2000-097423

(51) Int. Cl.$^7$ ................................................ G01B 9/00
(52) U.S. Cl. ..................................................... 356/124
(58) Field of Search .................................. 356/124, 125, 356/121, 128, 511–517, 521, 457, 489, 520, 508, 450, 498, 452, 469–477; 359/727, 355, 350, 642, 16, 18, 15, 823, 380

(56) References Cited

U.S. PATENT DOCUMENTS 6,008,904 A * 12/1999 Ishii et al. .................. 356/512
6,327,038 B1 * 12/2001 Maxey ........................ 356/450

FOREIGN PATENT DOCUMENTS

| JP | 10-160582 | * | 6/1998 |
| JP | 10-255304 | | 9/1998 |

* cited by examiner

Primary Examiner—Tu T. Nguyen
(74) Attorney, Agent, or Firm—Morgan, Lewis & Bockius LLP

(57) ABSTRACT

An aberration detector for easily detecting aberration of a lens in a short time period by utilizing an interferometer. The aberration detector includes a laser diode, a beam splitter for dividing a light beam into two light beams, an optical system for supporting a lens and converging a light beam passing through the lens to a converging point, a spherical mirror for reflecting the light beam passing through the lens, an image pickup element for detecting an interference pattern obtained by interference of a reference light and the light reflected on the spherical mirror, and an analyzer for analyzing the interference pattern. A center of a sphere constituting the spherical mirror is arranged in a position displaced from the converging point such that a plurality of circular fringes are concentrically arranged on the interference pattern.

8 Claims, 5 Drawing Sheets

APPARATUS FOR MEASURING ABERRATION OF A LENS AND AN APPARATUS FOR ADJUSTING A POSITION OF THE LENS

BACKGROUND OF THE INVENTION

1. Field of the Invention

The present invention relates to an aberration measuring apparatus for measuring aberration of a group lens set including an objective lens for use with an optical disk reproducing apparatus. The present invention also relates to an adjusting device for adjusting a position of a lens in a group lens set by using the aberration measuring apparatus when the group lens set consists of a plurality of lenses.

2. Description of the Related Art

A moving image with high definition and high quality sound can be recorded to an optical disk and reproduced from the optical disk, since digital technology has been developed in recent years. In accordance with this development, increase in memory capacity recorded to one optical disk is required. Accordingly, it is considered that recording and reproducing operations of high density are performed, by increasing a numerical aperture of an objective lens and reducing a spot diameter during the recording and reproducing operations. Therefore, a construction using a group lens set constructed by two lenses is required to increase the numerical aperture of the objective lens.

The group lens set has a large numerical aperture such as 0.75. This requires a high level of position adjustment in comparison with a spherical lens having a numerical aperture of about 0.5. Therefore, when the group lens set is assembled, it is necessary to manufacture the group lens set so that a position relation of the two lenses is adjusted by correctly evaluating an aberration. Such aberration are caused by a shift in an optical axis of the two lenses and distance between lenses of the lens set.

One example of a lens adjusting method is disclosed in Japanese Patent Laid-Open No. 10-255304. In this method, light is transmitted through the lenses, and the position relation of the lens is adjusted by moving one lens with respect to the other lens on the basis of the position and shape of a light spot picked up in an image pickup element, or on the basis of a diffraction pattern of the light.

However, in the adjusting method utilizing a converging spot, a problem exists in that it is difficult to determine a spot shape since the spot shape is small. Therefore, it is difficult to stably adjust the position relation on the basis of a diffraction pattern of the light.

Therefore, an adjusting method utilizing interference is also proposed instead of an observation of the spot shape. In this method, parallel light incident to the objective lens is once converged and is incident to a reference spherical surface, and is reflected on the reference spherical surface. The reflected light is then converted to parallel light, and interferes with a reference light provided by a plane wave so that interference fringes or fringe patterns are generated. The lens is adjusted on the basis of the interference fringes. In this method, an aberration of the group lens set is reflected in the interference fringes or fringe patterns. Accordingly, when the position of a second lens is moved with respect to a first lens such that the fringe patterns disappear and a monochromatic color is formed, the two lenses are accurately arranged positioned.

However, when this method is used, complicated processing is required to search a specific adjusting procedure from the interference fringes if no position of the group lens set is adjusted. Namely, an aberration must be normally analyzed by using a computer on the basis of the detected interference fringes. Therefore, it takes more than one minute to analyze the aberration since the fringe is scanned and a calculation is next made. Accordingly, no adjustment using the interference is conventionally practically used since it is inferior in working efficiency.

OBJECT AND SUMMARY OF THE INVENTION

An object of the present invention is to provide an aberration measuring apparatus for accurately and easily detecting an aberration by utilizing interference fringe patterns.

Another object of the present invention is to provide an adjusting device for adjusting a position of a lens in a group lens set consisting of a plurality of lenses accurately and easily adjusted by utilizing the interference fringes.

In one aspect of the present invention, an aberration measuring apparatus for detecting aberration of a lens for converging an incident light beam passing therethrough is characterized by comprising a laser for emitting a light beam of a single wavelength; a dividing unit for dividing the light beam into first and second light beams; an optical system for guiding said first light beam to said lens; a reflector having a concave mirror surface consisting of a portion of a sphere, and reflecting said first light beam incident thereon after said first light beam passing through said lens is converged to a converging point; a detector for detecting an interference pattern created when said second light beam and said first light beam reflected by said reflector interfere with each other; a driving unit for moving said reflector with respect to an optical axis of said optical system; and an analyzer for analyzing the aberration of said lens. The driving unit displaces a center of said sphere from said converging point so as to change said interference pattern to an interference fringe pattern consisting of a plurality of circles approximately concentrically arranged. The analyzer determines the aberration of said lens on the basis of a distribution of said plurality of circles.

In another aspect of the present invention, an adjusting apparatus for detecting an aberration of a group lens set consisting of a plurality of lenses to adjust the aberration is characterized by comprising an aberration measuring apparatus having a laser for emitting a light beam of a single wavelength; a dividing unit for dividing the light beam into first light and second light beam; an optical system for guiding said first light beam to said lens group; a reflector having a concave mirror surface constituting one portion of a sphere and reflecting said first light beam incident thereon after said first light beam passing through said lens group is converged to a converging point; a detector for detecting an interference pattern in which said first light beam reflected by said reflector and said second light-interfere with each other; a driving unit for moving said reflector with respect to an optical axis of said optical system; and an analyzer for analyzing the aberration of said group lens set; and an adjusting mechanism for adjusting a position of one of said plurality of lenses with respect to a position of another lens and an inclination of the optical axis of one of said plurality of lenses in said group lens set. The driving unit displaces a center of said sphere from said converging point so as to change said interference pattern to an interference fringe pattern comprising a plurality of circles approximately concentrically arranged; and the adjusting mechanism adjusts the position of said one of said plurality of lenses with respect to the position of said another lens and the inclination of the optical axis of said one of said plurality of lenses in response to an output of said aberration measuring apparatus.

BRIEF DESCRIPTION OF THE DRAWINGS

The aforementioned aspects and other features of the invention are explained in the following description, taken in connection with the accompanying drawing figures wherein.

DESCRIPTION OF THE PREFERRED EMBODIMENTS

A preferred embodiment of the present invention will be explained with reference to the drawings.

Figure 1:
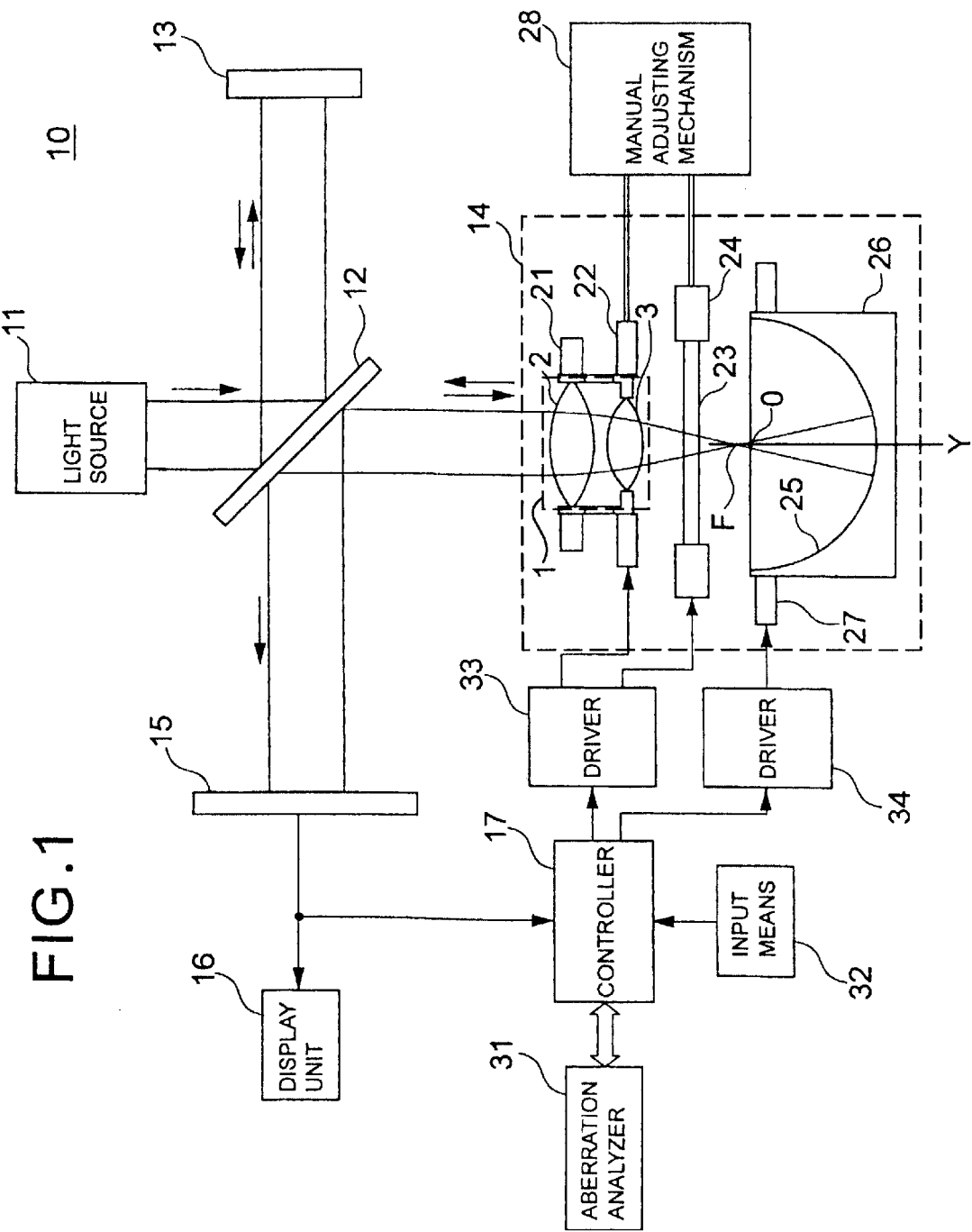
FIG. 1 is a view showing a structure of an objective lens adjusting device to which an aberration measuring apparatus of the present invention is applied.
Figure 2:
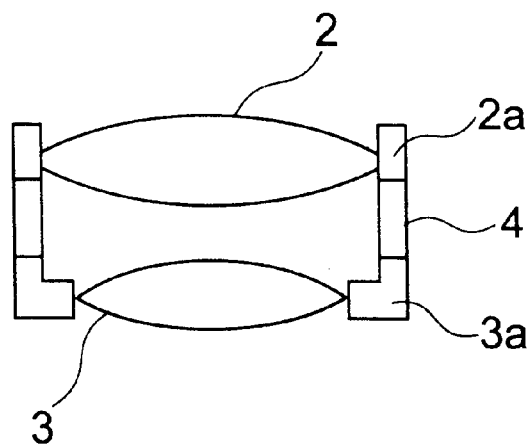
FIG. 2 is a block diagram showing one example of an objective lens consisting of two-group lens set.

FIG. 1 shows one embodiment of a lens adjusting device 10 according to the present invention. A lens being evaluated in the adjusting device 10 is an objective lens 1 for use in an optical pickup of an optical recording/reproducing apparatus. The objective lens comprises a two-group lens set comprising at least two lenses and having a numerical aperture (NA) such as 0.75. It should be noted that a group lens set having any number of a numerical aperture can be used in the present invention. FIG. 2 shows the objective lens in detail. The objective lens 1 includes a first lens 2 fitted into a first support frame 2a, and a second lens 3 fitted into a second support frame 3a. The first lens 2 and the second lens 3 are integrally constructed by assembling the first and second support frames 2a, 3a into a body tube 4. In a fine adjustment of each of the lenses 2 and 3, each of the support frames 2a and 3a is moved by an action of a force applied through the body tube 4 so as to act on the frames, so that relative positions and an optical axis of the lenses 2 and 3 are independently adjusted.

In FIG. 1, the objective lens adjusting device 10 comprises a laser diode 11, a beam splitter 12 for dividing a light beam from the laser diode into two light beams, a plane mirror 13 arranged on an optical path extending from the beam splitter 12, a measuring optical system 14 arranged on another optical path extending from the beam splitter 12 and including the objective lens 1, an image pickup element 15 having an image pickup surface arranged on a side opposed to a mirror 13 with respect to the beam splitter 12, a display unit 16 connected to the image pickup element 15, and a controller 17 connected to the image pickup element 15. It should be noted that further suitable optical elements can be arranged between the laser diode 11 and the beam splitter 12 to change light incident to the beam splitter 12 to a parallel light beam.

The measuring optical system 14 comprises a lens support mechanism 21, a lens support adjusting mechanism 22, a cover glass 23, a cover glass adjusting mechanism 24, and a spherical mirror 26. The lens support mechanism 21 supports the support frame 2a of the first lens 2 in the two-group lens set. The lens support adjusting mechanism 22 supports the support frame 3a of the second lens 3, and can move a position and a central axis of the second lens 3 with respect to the first lens 2. A light beam passing through the two-group lens set 1 is incident on the cover glass 23. The cover glass adjusting mechanism 24 supports the cover glass 23 and can adjust a position of the cover glass 23. The spherical mirror 26 has a concave mirror surface 25 for reflecting an incident light beam thereon. The spherical mirror 26 is provided with a mirror adjusting mechanism 27 for moving the spherical mirror 26 in the direction of an optical axis Y of the measuring optical system 14 or a direction perpendicular to the optical axis Y. The lens support adjusting mechanism 22 is provided with a manual adjusting mechanism 28. The manual adjusting mechanism 28 allows an operator to directly adjust a position and an inclination of the optical axis of a lens.

The cover glass 23 has the same thickness as that of an optical disk substrate that is recorded and reproduced with the objective lens 1. For example, the cover glass 23 is constructed by a parallel plate glass having a thickness of 600 $\mu$m. This cover glass 23 is arranged in a position in which light passing through the objective lens 1 impinges on the cover glass 23 prior to its focusing in the measuring optical system 14.

The spherical mirror 26 has a concave mirror surface 25 which consists of a part of a sphere. For example, the mirror 26 has a spherical inner surface 25 which has an inner radius on an order of 10 mm. A center of the sphere is set to a center O of the spherical mirror 26. The spherical mirror 26 can be moved by the mirror adjusting mechanism 27 in the direction of the optical axis Y of the measuring optical system 14.

The controller 17 is connected to an aberration analyzer 31, an input means 32 which can be operated by an operator operating the lens adjusting device, a first driver 33 for operating the lens support adjusting mechanism 22 and the cover glass adjusting mechanism 24, and a second driver 34 for operating the mirror adjusting mechanism 27. The controller 17 receives image data of an image formed on an image pickup surface of the image pickup element 15. The aberration analyzer 31 analyzes an interference pattern based on the image data to determine a type and an amount of an aberration. The input means 32 is constructed by a keyboard, and any type of input device. The input means transmits a command from the operator to the controller 17. The first driver 33 receives a control signal from the controller 17 for controlling positions of the lens 3 and the cover glass 23 to drive the corresponding adjusting mechanisms 22, 24. The second driver 34 receives a control signal from the controller 17 for controlling a position of the spherical mirror 27 to drive the adjusting mechanism 27.

An operation of the adjusting device according to the present invention will next be explained.

The laser diode 11 emits a laser beam to the beam splitter 12. The laser beam impinges on the beam splitter 12 as a parallel light beam. The laser beam is divided into two laser beams by the beam splitter 12. One laser beam is directed to the plane mirror 13 as a reference light beam. A light beam reflected from the plane mirror 13 again passes through the beam splitter 12, and then impinges on the image pickup element 15. The other laser beam is directed to the measuring optical system 14 as a measuring light beam.

The measuring light beam sequentially travels through the first lens 2 and the second lens 3 in the objective lens 1 so that the light beam is gradually converged. The light beam then passes through the cover glass 23. This light beam is converged to a converging point F to form a minimum diameter beam spot. The converging point F is the same as a focal point of the objective lens when a light beam incident to the objective lens 1 is considered to be a parallel light beam. After the light beam passes the converging point F, the light beam is diverged, and then impinges on the spherical mirror 26. The diverged light beam passing the converging point F is considered to be a light beam emitted from a point light source. Therefore, the light beam becomes or changes to spherical waves. The light beam is then reflected on the spherical mirror 26, and impinges to the objective lens 1. The light beam sequentially passes through the second lens 3 and the first lens 2 in the objective lens 1, and is reflected by the beam splitter 12. Finally, the light beam interferes with the reference light beam. The image pickup element 15 detects an interference pattern formed on the image pickup surface by interference of the measuring light beam returned from the spherical mirror 26 and the reference light beam.

At this time, the spherical mirror 26 is placed at a position slightly shifted from the converging point F not so as to match the center O with the converging point F. The center O is displaced in a direction parallel to the optical axis Y of the measuring optical system 14 with respect to the converging point F, and a direction perpendicular to the optical axis Y. The distance between the center O and the converging point F is controlled on an order of 0.1 $\mu$m.

Figure 3:
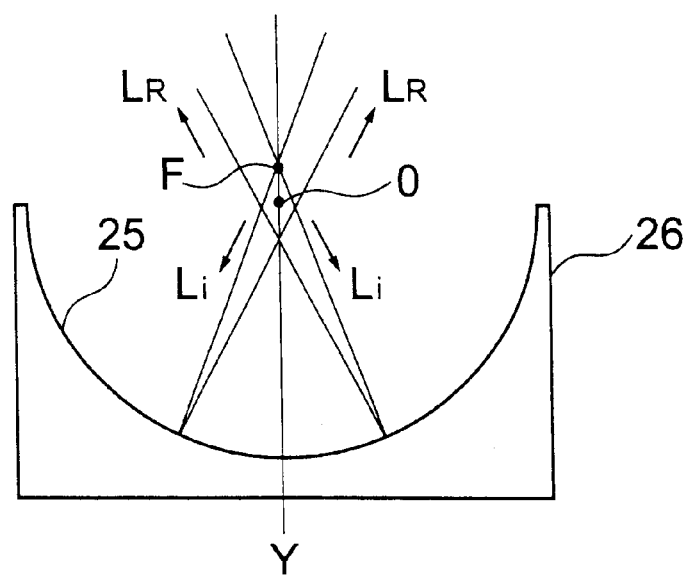
FIG. 3 is a view explaining the relationship between a spherical mirror and light passing through a lens.

FIG. 3 shows a view in which the center O is displaced from the converging point F. For example, when the converging point F is coincident with the center O of a sphere, light passing through the converging point F travels in a radial direction of the spherical mirror 26, so that the light reflected on a reflecting face returns to the converging point F. Namely, the light is returned to the objective lens 1 along an optical path in the opposite direction to that of which an incident light beam travels to the spherical mirror 26. The light beam passing through the objective lens 1 again returns to parallel light.

However, in this embodiment, the center O is arranged in a position different from the converging point F. Accordingly, a light beam Li passing through the converging point F and impinging on the spherical mirror 26 is reflected in a direction different from an incident direction thereof. Namely, the light beam does not pass through the converging point F, and returns to the objective lens 1 along an optical path (Lr) different from that at the incident time. Accordingly, the light beam does not pass through a focal point of the objective lens, so that the light beam changes to spherical waves.

Next, the light beam reflected on the spherical mirror 26 interferes with the reference light beam. For example, it is assumed that a plane mirror is arranged at the converging point F. When the light passing through the objective lens 1 with no aberration is reflected on the plane mirror and then interferes with the reference light beam, two different interference patterns may occur. For example, when an optical axis of the measuring light beam is inclined with respect to an optical axis of the reference light beam, several parallel fringes composed of light and dark bands corresponding to interference light intensity are observed. In contrast to this, when there is no inclination of the optical axis, the entire pattern becomes light or dark instead of showing an appearance of fringe patterns.

Figure 4:
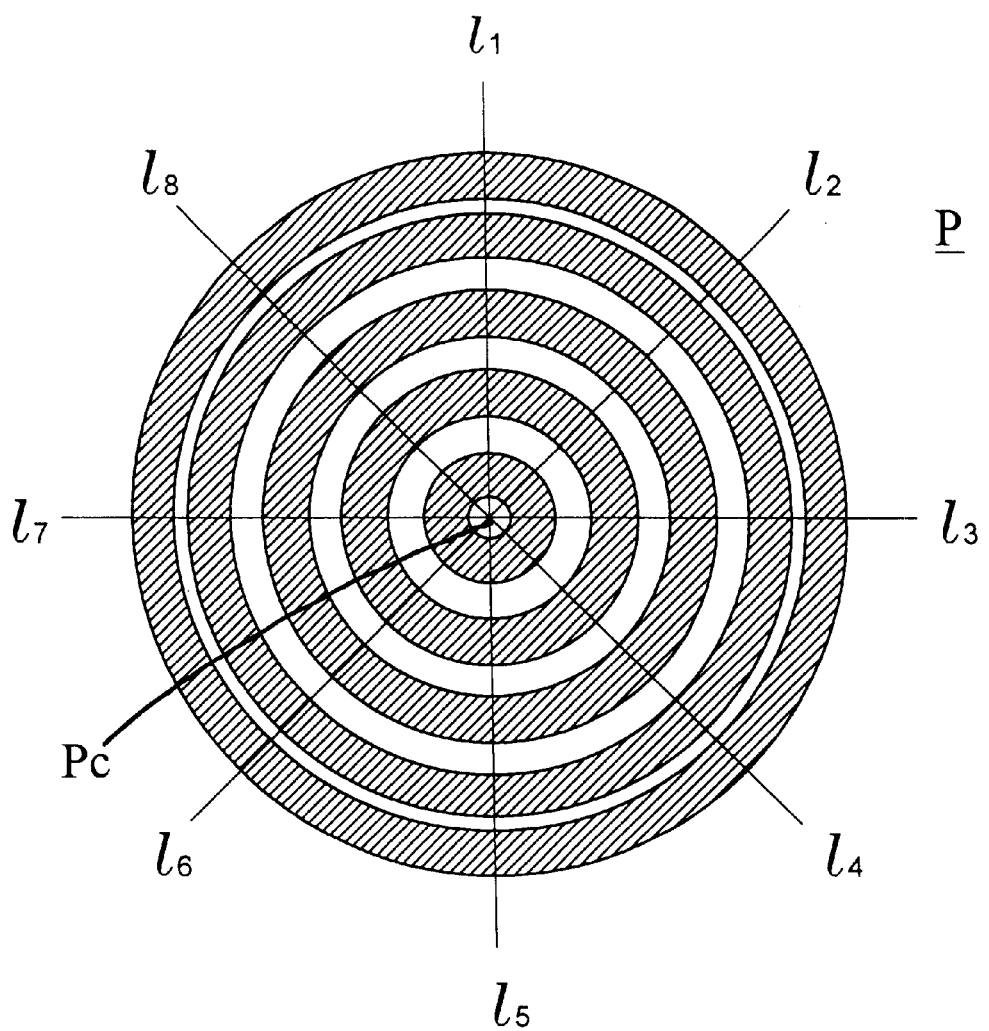
FIG. 4 is a view showing an ideal interference pattern when a lens has no aberration to be measured.

In this embodiment, the spherical center O of the spherical mirror 26 is shifted from the converging point F in the range of an order of 0.1 $\mu$m. Therefore, when the spherical waves returned from the measuring optical system 14 interfere with the reference light beam, an interference pattern P detected by the image pickup element 15 normally has a plurality of circular fringes in which interference light intensity corresponds to light and dark bands or rings on the image pickup surface as shown in FIG. 4. Namely, in the interference pattern P, a plurality of circles are approximately concentrically arranged.

When fringe patterns are not arranged in the concentric shape in the interference pattern P such as a case in which a plurality of fringes appear approximately in parallel with each other, the controller 17 moves the spherical mirror 26 through the driver 34 and the mirror adjusting mechanism 27 by a control signal in the direction of the optical axis Y of the measuring optical system 14 or a direction perpendicular to the optical axis Y with respect to the converging point F. Thus, the controller 17 adjusts a shape of the interference pattern P such that the plurality of circular fringe patterns appear approximately in concentric circles. The interference pattern preferably includes at least four circular fringe patterns approximately arranged in a concentric shape to provide a measuring accuracy required for a lens adjustment. However, the number of circles is not limited to four, but can be set to any number. Therefore, the position of the spherical mirror 26 is adjusted with respect to the measuring optical system 14 to arrange at least four circular fringes approximately in a concentric shape in the interference pattern P.

Further, the controller 17 searches a circle of a minimum radius, i.e., an innermost circle of the interference fringe patterns formed approximately in a concentric shape. Next, the spherical mirror 26 is moved by the mirror adjusting device 27 with respect to the optical axis of the measuring optical system 14 such that a center Pc of the innermost circle is located within an image pickup area of the image pickup element 15. The center Pc of the innermost circle is preferably adjusted such that the center Pc is approximately located on a center of the image pickup face of the image pickup element 15. Thus, concentric interference fringes are projected to the image pickup element 15 at any time. Next, the display unit 16 displays the interference fringe patterns.

After the interference fringes in the interference pattern P are changed to a plurality of circular fringes substantially concentrically arranged, the aberration analyzer 31 begins to analyze the interference pattern P in response to commands from the controller 17.

As shown in FIG. 4, the aberration analyzer 31 draws auxiliary lines $l_1$ to $l_8$ in eight radial directions 45° from the center Pc of the innermost circle with respect to the interference pattern P, and measures spacings between fringes crossing these lines. The aberration analyzer 31 determines an aberration of a lens and amount of the aberration based on lengths of the spacings and their distribution. The measurement can be made within a short time period by using this method. This is because it is not necessary to perform any process requiring time period in which scanning of the fringes is performed or in which data obtained by the fringe scanning are expanded to aberration coefficients.

FIG. 4 shows an ideal interference pattern made by a lens having no aberration. If the objective lens 1 has no aberration, the interference pattern P is obtained such that a plurality of circular fringes are arranged in a concentric shape about the center Pc of the innermost circle. The ideal interference pattern P has a plurality of concentric circular fringes obtained on a cutting face on which a plurality of spherical surfaces having the same centers and radii different from each other every constant value are cut on a plane. In the ideal interference pattern, the fringe spacing measured from the center Pc of the innermost circle radially is the same in each of directions $l_1$ to $l_8$.

Accordingly, for example, when the spacing between two interference fringes adjacent to each other is the same on each of the auxiliary lines $l_1$ to $l_8$, and is shortened in one auxiliary line direction every predetermined distance, it is determined that the lens has no aberration.

Figure 5:
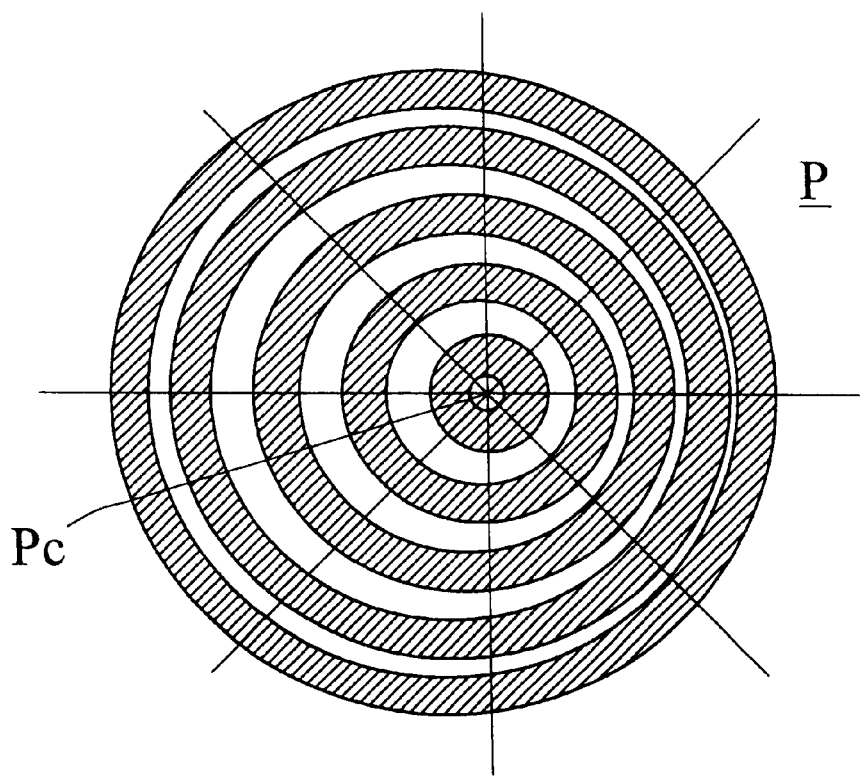
FIG. 5 is a view showing an interference pattern when a lens to be measured has comatic aberration.

FIG. 5 shows an interference pattern P in case of a lens has comatic aberration. If an objective lens has comatic aberration, it is found that the fringe spacing is narrowed only in a specific direction as shown in FIG. 5. Therefore, when a most narrowing direction of the spacing between two interference fringes adjacent to each other is approximately the same direction in any portion between the interference fringes, it can be determined that the lens has a comatic aberration. When the comatic aberration is quantitatively shown, the most narrowing direction of the fringe spacing and amount of the aberration are displayed.

An adjustment of the comatic aberration of the objective lens 1 based on the above data will next be explained. The comatic aberration may occur when the cover glass 23 is inclined with respect to the optical axis of the measuring optical system 14. Accordingly, before the lens is adjusted, the controller 17 supplies a cover glass position adjusting signal to the driver 33, the cover glass adjusting mechanism 24 attempts to remove the comatic aberration by adjusting the inclination of the cover glass 23. If the adjustment of the cover glass fails in removal of the comatic aberration, it is determined that the objective lens 1 has a comatic aberration. Accordingly, in order to remove comatic aberration, a relative position between the first and second lenses 2, 3 and an inclination of the second lens 3 with respect to the first lens 2 are adjusted by operating the lens support adjusting mechanism on the basis of data supplied from the aberration analyzer 31.

In the above lens adjusting method, the controller 17 determines a concrete lens adjusting method in accordance with the detected aberration. However, it is within the scope of the present invention to use any type of lens adjusting method. An operator directly observing an interference pattern displayed in the display unit 16 can command a concrete adjusting operation to the controller 17 through the input means 22. Alternatively, the operator can directly adjust a lens position and an inclination of the optical axis by operating the manual adjusting mechanism 27.

Figure 6:
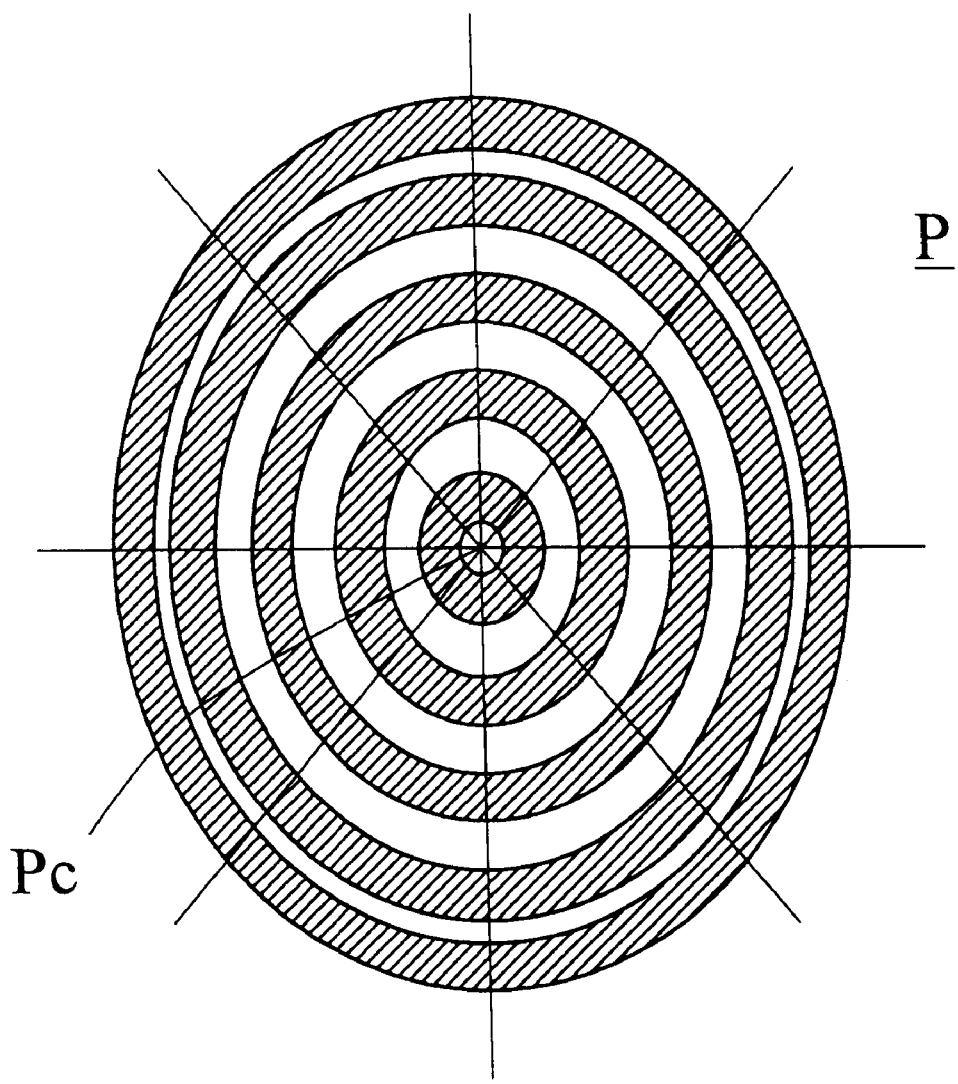
FIG. 6 is a view showing an interference pattern when a lens to be measured has an astigmatism.

FIG. 6 shows an interference pattern P when the lens has an astigmatism. When the lens 1 has an astigmatism, it is known that the fringe spacing in one direction of two perpendicular directions is narrowed, and the fringe spacing in the other direction is widened in the interference pattern P as shown in FIG. 6. Therefore, a direction for maximizing the difference in spacing in two directions perpendicular to each other between interference fringes adjacent to each other and measured by auxiliary lines in the two directions of the auxiliary lines drawn with respect to the interference pattern P is directly calculated, or is calculated by an interpolation with respect to an angular direction. When an astigmatism is quantitatively displayed, such a maximizing direction and amount of the astigmatism are displayed.

Accordingly, in order to remove such astigmatism, similar to the adjustment of the comatic aberration, the cover glass 23 is adjusted, and the objective lens 1 is then adjusted by moving and rotating the position of the second lens 3 with respect to the first lens 2 by the lens support adjusting mechanism 22.

As mentioned above, an auxiliary line passing through the center of an innermost circle is drawn in a radiating direction with respect to the interference pattern consisting of a plurality of circular fringes concentrically arranged. A type of aberration of a lens and amount of aberration can be easily determined based on spacings of the interference fringe crossing each auxiliary line and their distribution. Thus, generation of comatic aberration and astigmatism and its generating amount can be easily measured without using fringe scan so that the objective lens constructed by a two-group lens set can be adjusted for a short time.

When the objective lens 1 has a spherical aberration, a distance from the center of the interference pattern to a certain specific fringe is the same in any direction. But the distance is different from a distance obtained from an ideal interference pattern. This difference corresponds to a value associated with an amount of spherical aberration. Then, the second lens 3 is adjusted with respect to the first lens 2 on the basis of such a measured value.

In the above embodiment, the position of one lens and the inclination of an optical axis with respect to the other lens are adjusted by detecting an aberration of the objective lens consisting of a two-group lens set. However, it is also included within the range of the present invention that the aberration of a lens consisting of only a single lens is easily detected without using the fringe scan.

In the above embodiment, the detected interference pattern can be displayed in the display unit 16 such as a screen. As another display method of the interference pattern, there is a method for displaying a type and amount of aberration by means of numeric values, and a method for displaying an aberration direction by a luminescent spot.

Further, in the above embodiment, eight auxiliary lines are drawn, but any number of auxiliary lines can be used dependent on measurement accuracy and a lens being measured. Further, it is also possible to use a well-known image processing method in which the interference pattern is detected as an image, and feature points are extracted, etc.

It is understood that the foregoing description and accompanying drawings set forth the preferred embodiments of the invention at the present time. Various modifications, additions and alternative designs will, of course, become apparent to those skilled in the art in light of the foregoing teaching without departing from the spirit and scope of the disclosed invention. Thus, it should be appreciated that the invention is not limited to the disclosed embodiments but may be practices within the full scope of the appended claims.

What is claimed is:

1. An aberration measuring apparatus for detecting an aberration of a lens for converging an incident light beam passing therethrough, said apparatus comprising:
    a laser for emitting a light beam of a single wavelength;
    an optical system for dividing the light beam into first and second light beams, and for guiding said first light beam to said lens;
    a reflector having a concave mirror surface consisting of a portion of a sphere having a center of curvature, and reflecting said first light beam incident thereon after said first light beam passing through said lens is converged to a converging point different than the center of curvature;
    a detector for detecting an interference pattern created when said second light beam and said first light beam reflected by said reflector interfere with each other;
    a driving unit for moving said reflector with respect to an optical axis of said optical system, thereby displacing the center of curvature from the converging point so as to change said interference pattern to an interference fringe pattern comprising a plurality of circles arranged approximately concentrically; and an analyzer for analyzing the aberration of said lens and determining the aberration of said lens based on an analysis of a distribution of said plurality of circles.

2. An aberration measuring apparatus for detecting an aberration of a lens for converging an incident light beam passing therethrough, said apparatus comprising:

a laser for emitting a light beam of a single wavelength;

a dividing unit for dividing the light beam into first and second light beams;

an optical system for guiding said first light beam to said lens;

a reflector having a concave mirror surface consisting of a portion of a sphere having a center of curvature, and reflecting said first light beam incident thereon after said first light beam passing through said lens is converged to a converging point;

a detector for detecting an interference pattern created when said second light beam and said first light beam reflected by said reflector interfere with each other;

a driving unit for moving said reflector with respect to an optical axis of said optical system, thereby displacing the center of curvature from the converging point so as to change said interference pattern to an interference fringe pattern comprising a plurality of circles arranged approximately concentrically; and an analyzer for analyzing the aberration of said lens and determining the aberration of said lens based on an analysis of a distribution of said plurality of circles, wherein said analyzer draws a plurality of auxiliary lines radially from a center of a minimum circle having a minimum radius from among said plurality of circles to measure spacings between said plurality of circles crossing said auxiliary lines, and determines the aberration of said lens on the basis of the measured spacings on each one of said plurality of auxiliary lines and the distribution of said spacings.

3. An aberration measuring apparatus according to claim 2, wherein said analyzer directly calculates one of a coarsest and a closest direction of the spacings measured on said plurality of auxiliary lines in each direction of said plurality of circles measured on said plurality of auxiliary lines, and determines the aberration of said lens on the basis of said coarsest or closest direction and its spacing.

4. An aberration measuring apparatus according to claim 2, wherein said analyzer calculates one of a coarsest and a closest direction of the spacings measured on said plurality of auxiliary lines in each direction of said plurality of circles measured on said plurality of auxiliary lines by means of an interpolation with respect to an angular direction, and determines the aberration of said lens on the basis of said coarsest or closest direction and its spacing.

5. An aberration measuring apparatus according to claim 2, wherein said analyzer calculates a direction for maximizing a difference in the spacings between adjacent circles of said plurality of circles in two directions perpendicular to each other between adjacent circles of said plurality of circles, said difference being directly measured on auxiliary lines in said two directions among said plurality of auxiliary lines, and determines the aberration of said lens on the basis of said two directions and said difference.

6. An aberration measuring apparatus according to claim 2, wherein said analyzer calculates a direction for maximizing a difference in the spacings between adjacent circles of said plurality of circles in two directions perpendicular to each other between adjacent circles of said plurality of circles, said difference being measured on auxiliary lines in said two directions among said plurality of auxiliary lines by means of an interpolation with respect to an angular direction, and determines the aberration of said lens on the basis of said two directions and said difference.

7. An aberration measuring apparatus according to claim 2, wherein, when said plurality of circles are concentrically arranged, said analyzer determines whether said lens has a spherical aberration on the basis of a distribution of the spacing in which one auxiliary line among said plurality of auxiliary lines crosses said plurality of circles, and when the lens is determined to have the spherical aberration, said analyzer calculates an amount of the spherical aberration.

8. An adjusting apparatus for detecting an aberration of a group lens set consisting of a plurality of lenses to adjust the aberration, comprising:

an aberration measuring apparatus having a laser for emitting a light beam of a single wavelength;

an optical system for dividing the light beam into first light and second light beam, and for guiding said first light beam to said group lens set;

a reflector having a concave mirror surface constituting one portion of a sphere having a center of curvature and reflecting said first light beam incident thereon after said first light beam passing through said lens group is converged to a converging point different than the center of curvature;

a detector for detecting an interference pattern in which said first light beam reflected by said reflector and said second light beam interfere with each other;

a driving unit for moving said reflector with respect to an optical axis of said optical system; and an analyzer for analyzing the aberration of said group lens set; and an adjusting mechanism for adjusting a position of one of said plurality of lenses with respect to a position of another lens and an inclination of the optical axis of one of said plurality of lenses in said group lens set;

wherein said driving unit displaces the center of curvature from the converging point so as to change said interference pattern to an interference fringe pattern comprising a plurality of circles approximately concentrically arranged; and said adjusting mechanism adjusts the position of said one of said plurality of lenses with respect to the position of said another lens and the inclination of the optical axis of said one of said plurality of lenses in response to an output of said aberration measuring apparatus.

* * * * *